United States Patent [19]

Tsai

[11] Patent Number: 5,856,729
[45] Date of Patent: Jan. 5, 1999

[54] APPARATUS AND METHOD FOR COMPENSATING THE DISTORTION ON A SCREEN DISPLAY

[75] Inventor: Cheng-Di Tsai, Taipei, Taiwan

[73] Assignee: Mitac International Corp., Taiwan

[21] Appl. No.: 748,976

[22] Filed: Nov. 14, 1996

[51] Int. Cl.⁶ .................................................. G09G 1/04
[52] U.S. Cl. ............................................................ 315/370
[58] Field of Search ................................... 315/370, 371; 348/806

[56] References Cited

U.S. PATENT DOCUMENTS

| | | | |
|---|---|---|---|
| 3,992,647 | 11/1976 | Yamada et al. | 315/370 |
| 4,296,359 | 10/1981 | Dodds | 315/370 |
| 5,021,712 | 6/1991 | Sands et al. | 315/370 |

Primary Examiner—Gregory C. Issing
Attorney, Agent, or Firm—Finnegan, Henderson, Farabow, Garrett & Dunner, L.L.P.

[57] ABSTRACT

The present invention includes a DC signal generating circuit for generating a DC signal and a ramp signal generating circuit for generating a periodic ramp signal. A synthesizing circuit is then used to combine the DC signal and the ramp signal to generate a synthesized signal, where the DC level of the synthesized signal is determined by the DC level of the DC signal. A driving circuit is used to amplify the power of the synthesized signal. A rotate coil surrounding the neck of a cathode-ray tube is responsive to the amplified synthesized signal, and therefore generates a magnetic force to turn electron beam in the cathode-ray tube, thereby compensating the trapezoidal distortion on the bottom and the top edges of a screen display.

22 Claims, 9 Drawing Sheets

APPARATUS AND METHOD FOR COMPENSATING THE DISTORTION ON A SCREEN DISPLAY

BACKGROUND OF THE INVENTION

1. Field of the Invention

The present invention relates to apparatus and method for compensating the distortion on a screen display, and particularly to apparatus and method for compensating the distortion on the bottom and top edges of a screen display.

2. Description of the Prior Art

A display on a monitor or a television set is usually distorted geometrically due to the imperfection of a cathode-ray tube or the influence from the surrounding environment. FIGS. 1A to 1F demonstrate some types of geometrical distortion, which are often referred to as horizontally trapezoidal distortion. This distortion exists on the right or left edge, and is caused mainly by the imperfection of the yoke surrounding a cathode-ray tube (CRT) during manufacturing. Although the supply of the CRTs is regulated by CRT manufacturers according to their specification, the distortion is quite noticeable for CRT larger than 17 inches. Therefore, monitor manufacturers usually add some compensating circuits to correct this type of distortion.

FIGS. 2A to 2D show another type of geometrical distortion, which are usually referred to as horizontal pincushion distortion. This distortion exists on the right or left edge, and is caused mainly by the non-roundness on the surface of the screen. The monitor manufacturers usually compensate this type of distortion through the adjustment of a bias current in the monitor. For example, the distortion in FIG. 2C can be corrected by making the length of the central horizontal scan longer than the length of the top or the bottom scan.

FIGS. 3A to 3D further show some examples of pincushion type of geometrical distortion. These examples differ from those in FIGS. 2A–2D on the locations where the distortion occurs. The pincushion type of distortion on the top or bottom edge is also caused by the non-roundness on the surface of the scan, and is usually corrected through the yoke by the CRT manufacturer. Unfortunately, for the pincushion type of distortion on the top or bottom edge, the monitor manufactures usually do not apply further compensation or adjustment unless excellent quality requested.

FIGS. 4A 4F demonstrate another trapezoidal distortion on the top and/or bottom edge. Although the supply of the CRTs is regulated by CRT manufacturers according to their specification, this type of distortion is quite noticeable for CRT larger than 17 inches. Unfortunately, their is no apparatus or method provided for compensating the distortion on the bottom and top edges of a screen display.

A rotate coil 52, shown in FIG. 5, surrounding a cathode-ray tube 50 and near a yoke 54, is used to correct a tilt problem of the screen display. However, this rotate coil 52 could not be used directly to solve any aforementioned type of distortion.

SUMMARY OF THE INVENTION

It is therefore a primary object of this invention to provide apparatus and a method for compensating the trapezoidal distortion on the bottom and top edges of a screen display such as a television set or a monitor.

In accordance with the present invention, apparatus is provided for compensating the trapezoidal distortion on the bottom and top edges of a screen display. In one embodiment, a DC signal generating circuit is used to generate a DC signal, and a ramp signal generating circuit is used to generate a periodic ramp signal. A synthesizing circuit such as an adder is then used to combine the DC signal and the ramp signal to generate a synthesized signal, where the DC level of the synthesized signal is determined by the DC level of the DC signal. A driving circuit such as an amplifier is used to amplify the power of the synthesized signal. A rotate coil surrounding the neck of a cathode-ray tube is responsive to the amplified synthesized signal, and therefore generates a magnetic force to turn electron beam in the cathode-ray tube, thereby compensating the trapezoidal distortion on the bottom and the top edges of a screen display.

The present invention further provides a method for compensating the trapezoidal distortion on the bottom and top edges of a screen display. Firstly, a DC signal and a periodic ramp signal are generated. The DC signal and the ramp signal are then combined to generate a synthesized signal, where the DC level of the synthesized signal is determined by the DC level of the DC signal. The power of the synthesized signal is then amplified, and a magnetic force is generated to turn electron beam in the cathode-ray tube, thereby compensating the trapezoidal distortion on the bottom and the top edges.

DESCRIPTION OF THE PREFERRED EMBODIMENTS

Figure 1A:
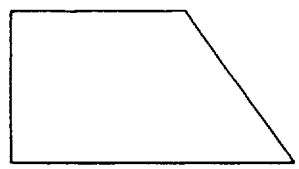
FIGS. 1A to 1F demonstrate trapezoidal distortion that exists on the right and/or left edge of a screen display.
Figure 1D:
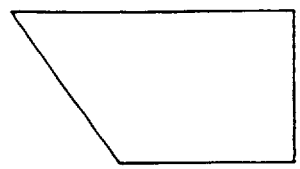
Figure 1B:
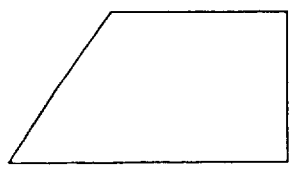
Figure 1E:
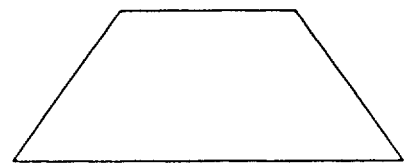
Figure 1C:
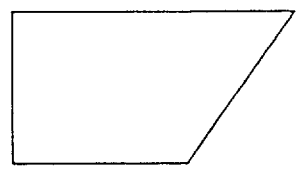
Figure 1F:
Figure 2A:
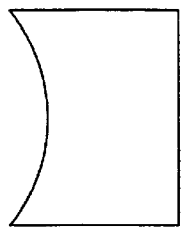
FIGS. 2A to 2D demonstrate pincushion distortion that exists on the right and/or left edge of a screen display.
Figure 3A:
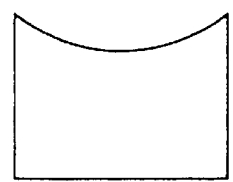
FIGS. 3A to 3D demonstrate pincushion distortion that exists on the top and/or bottom edge of a screen display.
Figure 2B:
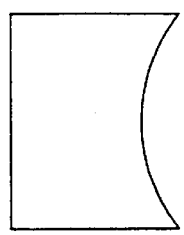
Figure 3B:
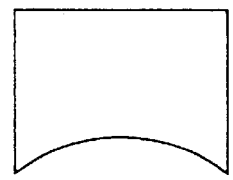
Figure 2C:
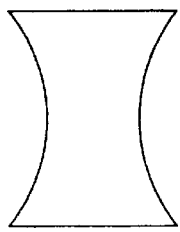
Figure 3C:
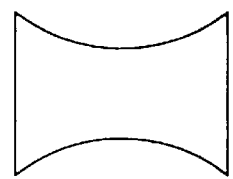
Figure 2D:
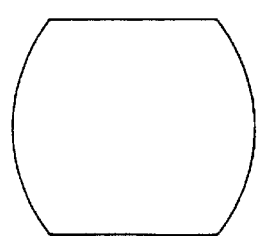
Figure 3D:
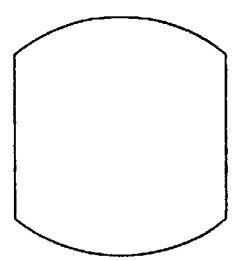
Figure 4A:
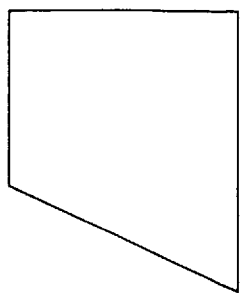
FIGS. 4A to 4F demonstrate trapezoidal distortion that exists on the top and/or bottom edge of a screen display.
Figure 4D:
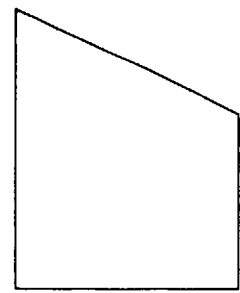
Figure 4B:
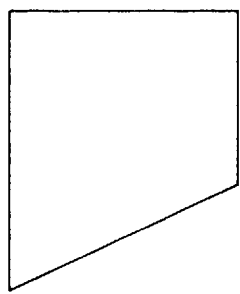
Figure 4E:
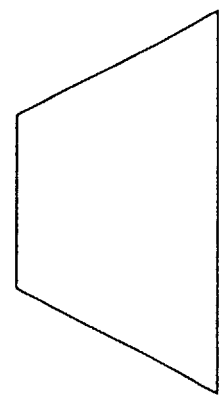
Figure 4C:
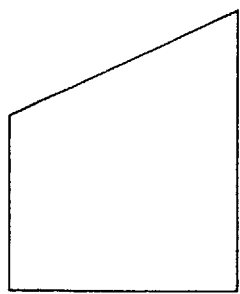
Figure 4F:
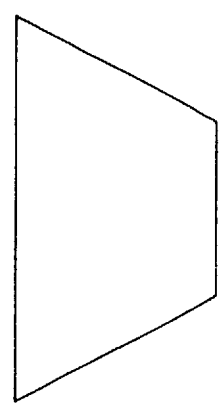
Figures 5, 6:
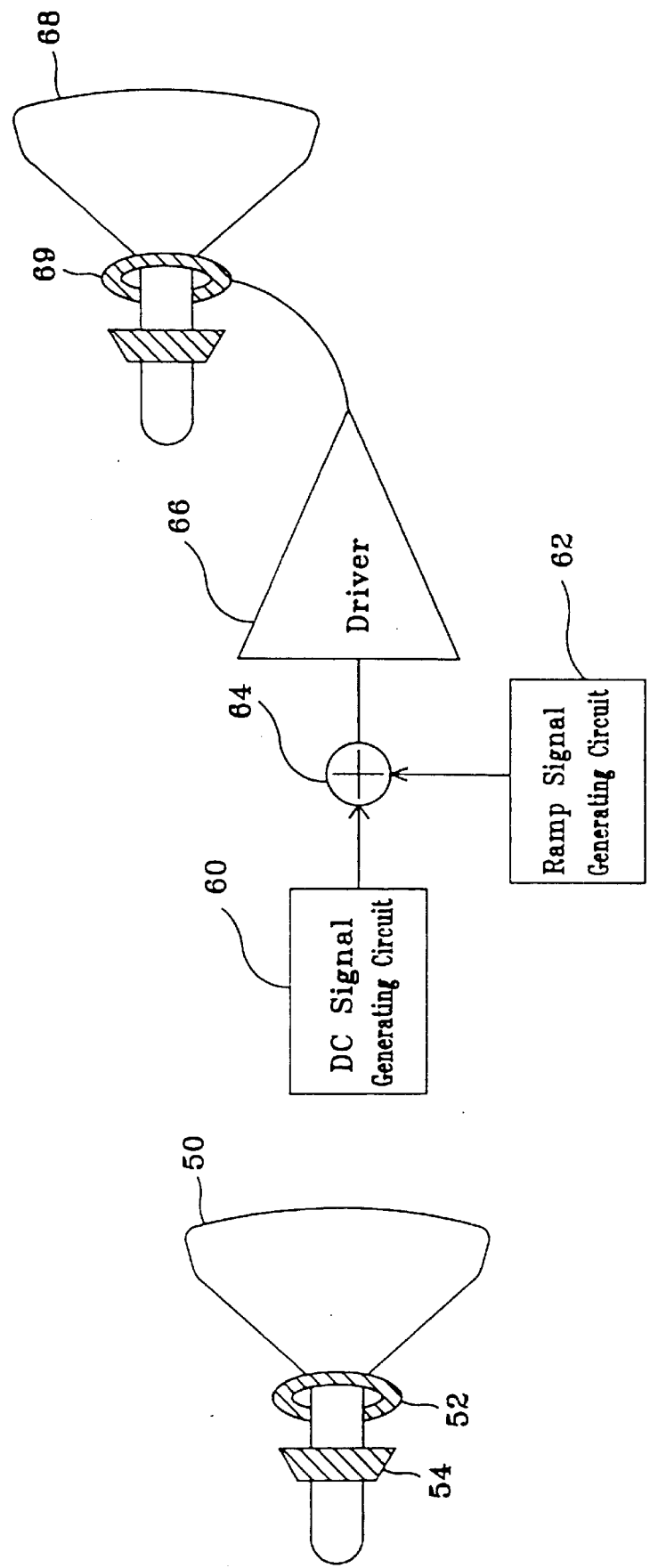
FIG. 5 shows a cathode-ray tube with a rotate coil and a yoke.
FIG. 6 shows the block diagram of the present invention.

FIG. 6 shows the block diagram of the present invention, where a DC generating circuit 60 is used to generate a DC voltage or DC current. A ramp signal generating circuit 62 is used to generate a periodic ramp signal, whose period is the same as the vertical period of the screen display of a cathode-ray tube (CRT) 68. The DC signal generating circuit 60 mentioned above can be a conventional DC voltage circuit or a DC current circuit, and the ramp signal generating circuit 62 can be a conventional ramp signal circuit. A synthesizer 64 such as a conventional analog adder is then used to add the DC signal and the ramp signal, and to generate a synthesized signal. The DC level of the synthesized signal is determined by the DC level of the DC signal. Afterwards, the synthesized signal is fed to a driver 66 such as a conventional power amplifier or a current driver for amplifying the power or the current of the synthesized signal. The amplified synthesized signal from the driver 66 becomes zero whenever the DC signal is equal to a constant reference signal Vr and the ramp signal is zero. Next, the amplified synthesized signal is coupled to a rotate coil 69 surrounding the neck of the CRT 68. According to Lentz's law, the current flowing in the rotate coil 69 generates a magnetic force or magnetic field. Further, the electric beam inside the CRT 68 forms an electrical current, which is influenced and turned by the aforementioned magnetic force in accordance with the Fleming's left hand law, therefore compensating the trapezoidal distortion on the top and/or bottom edges of the screen display.

Figure 7A:
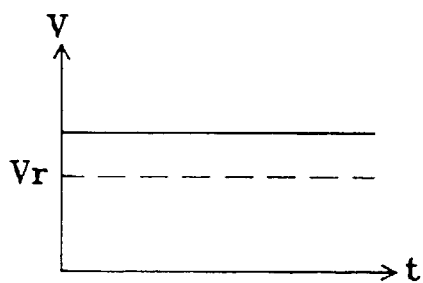
FIGS. 7A to 7D illustrate the relationship between the applied synthesized signal and the correspondingly resultant display.
Figure 7B:
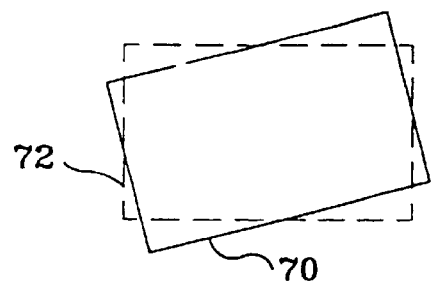
Figure 7C:
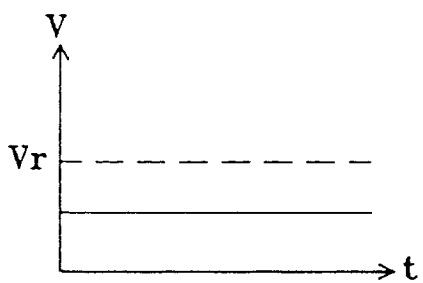
Figure 7D:
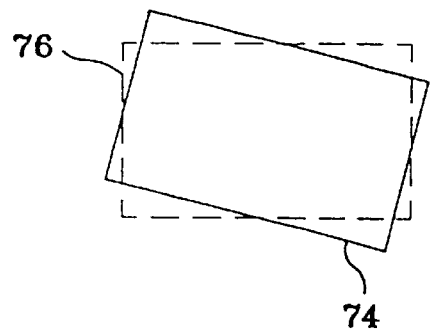
Figure 8A:
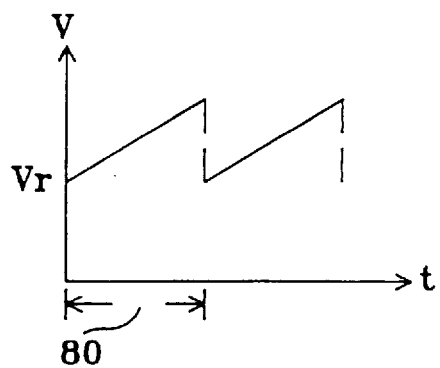
FIGS. 8A to 8F illustrate some embodiments of the ramp signals required to compensate the trapezoidal distortion shown in FIGS. 4A–4F.
Figure 8D:
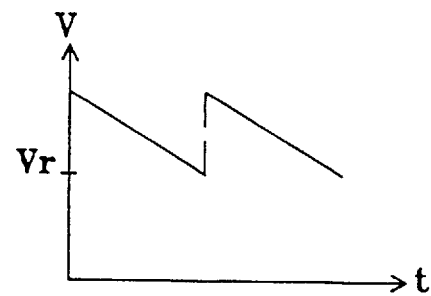
Figure 8B:
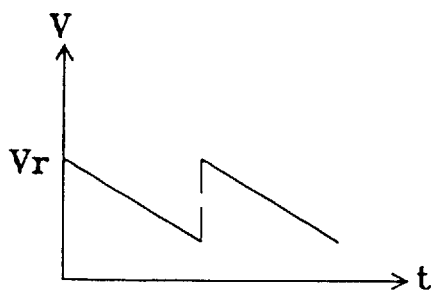
Figure 8E:
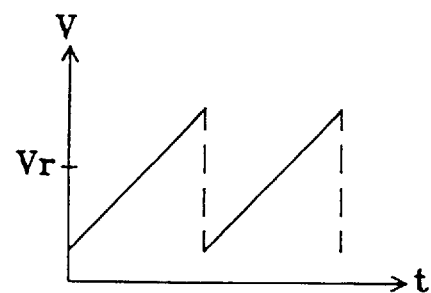
Figure 8C:
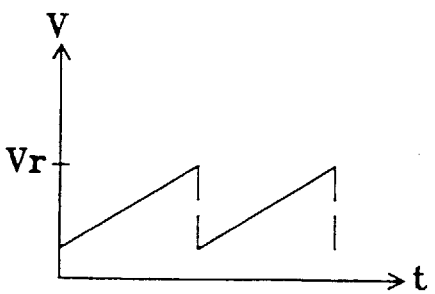
Figure 8F:
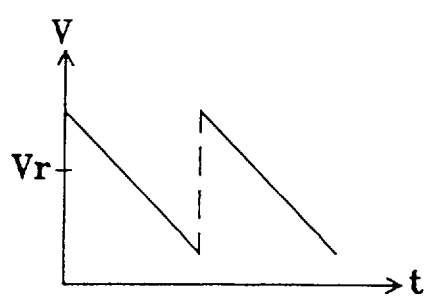

Referring to FIG. 7A, when the amplified DC synthesized signal is greater than the constant reference voltage Vr, an original display 72, shown in FIG. 7B, is turned counterclockwise, therefore forming another display 70. On the contrary, when the amplified DC synthesized signal is smaller than the constant reference voltage Vr, as shown in FIG. 7C, an original display 76 is turned clockwise, thereby forming another display 74. It is appreciated that the movement of the display could be opposite to that described above due to different circuit design or the direction of the rounding of the rotate coil.

FIGS. 8A through 8F illustrate some embodiments of the ramp signals required to compensate the trapezoidal distortion shown in FIGS. 4A–4F, where the period 80 is the same as the vertical period of the screen display of the CRT. FIGS. 9A through 9F show the resultant displays corresponding to the ramp signals in FIGS. 8A–8F. The original display in each of FIGS. 9A–9F is designated in solid line, and the resultant display is designated in dash line.

Figure 9A:
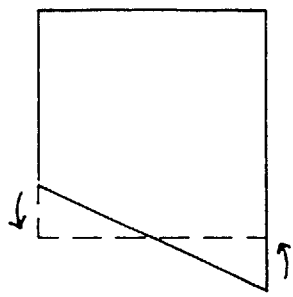
FIGS. 9A to 9F show the resultant displays corresponding to the ramp signals in FIGS. 8A–8F.
Figure 9B:
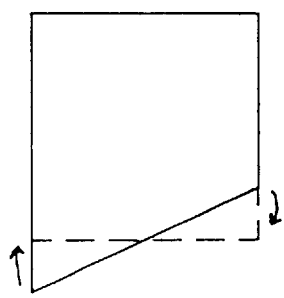
Figure 9C:
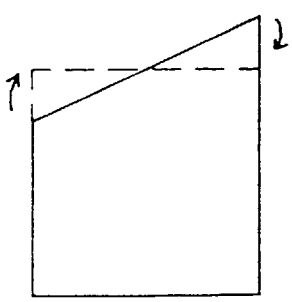
Figure 9D:
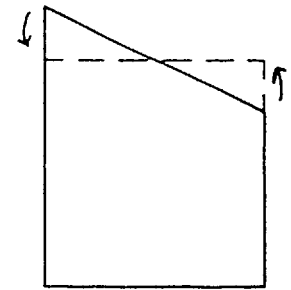
Figure 9E:
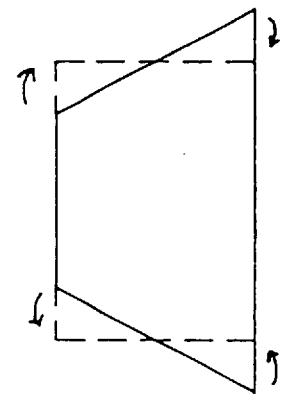
Figure 9F:
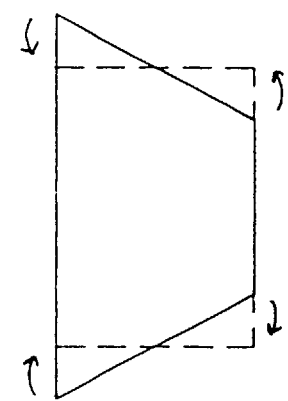

As the synthesized signal is greater than the reference voltage Vr, one of the top and bottom edges is turned counterclockwise as shown in FIGS. 9A and 9D. When the synthesized signal is smaller than the reference voltage Vr, one of the top and bottom edges is turned clockwise as shown in FIGS. 9B and 9C. When a portion of the synthesized signal is greater than the reference voltage Vr and the other portion of the synthesized signal is smaller than the reference voltage Vr, both the top and the bottom edges are turned as shown in FIGS. 9E and 9F. The display and the ramp signal is controlled by the ramp signal generating circuit, and the peak magnitude of the ramp signal is adjusted according to the extent of the distortion, that is, a large peak magnitude of the ramp signal is required for a great extent of the distortion.

Figure 10A:
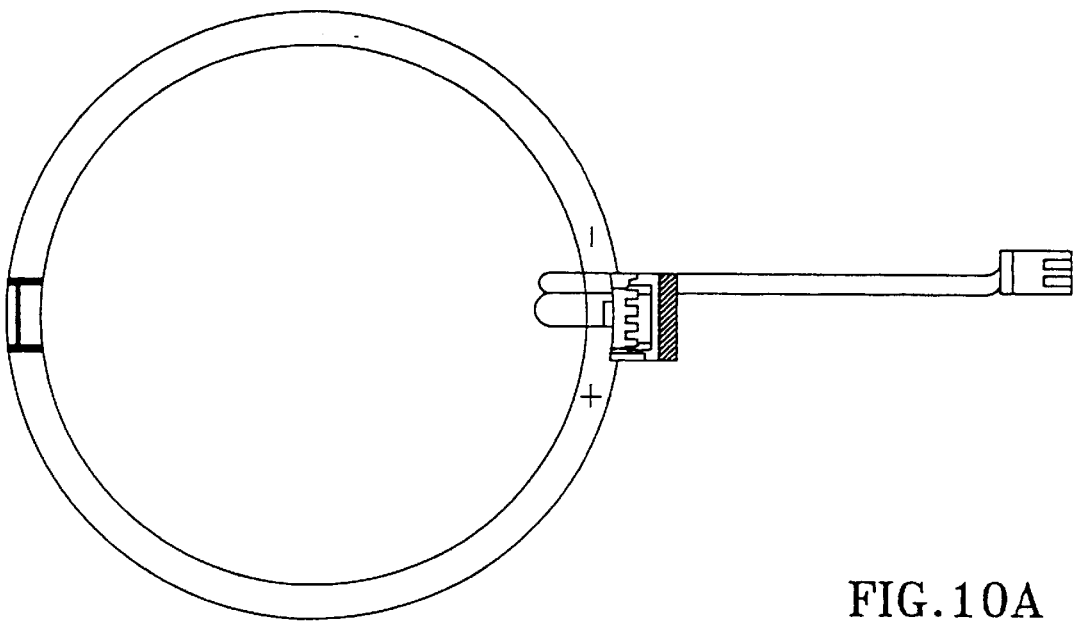
FIG. 10A shows a side view of the rotate coil according to the present invention.
Figure 10B:
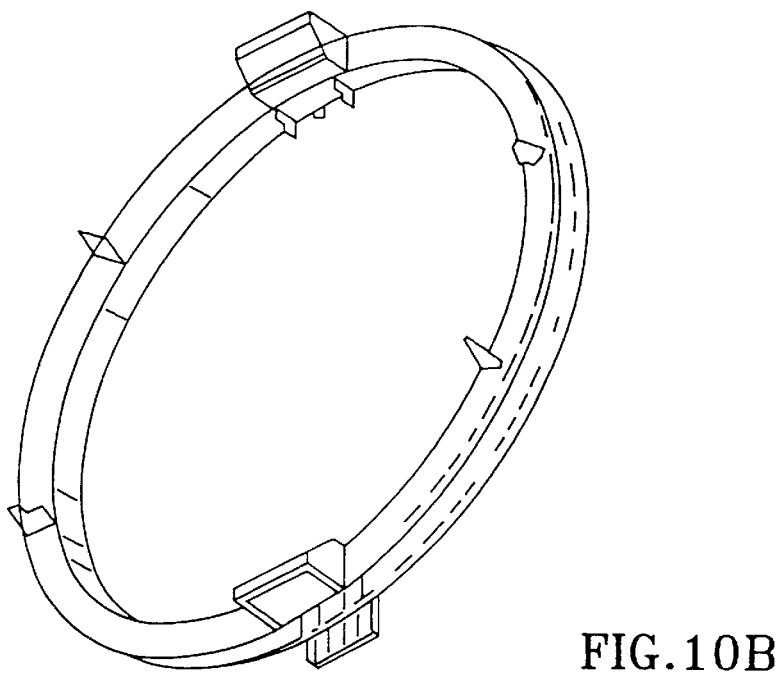
FIG. 10B shows the perspective view of the rotate coil according to the present invention.
Figure 11:
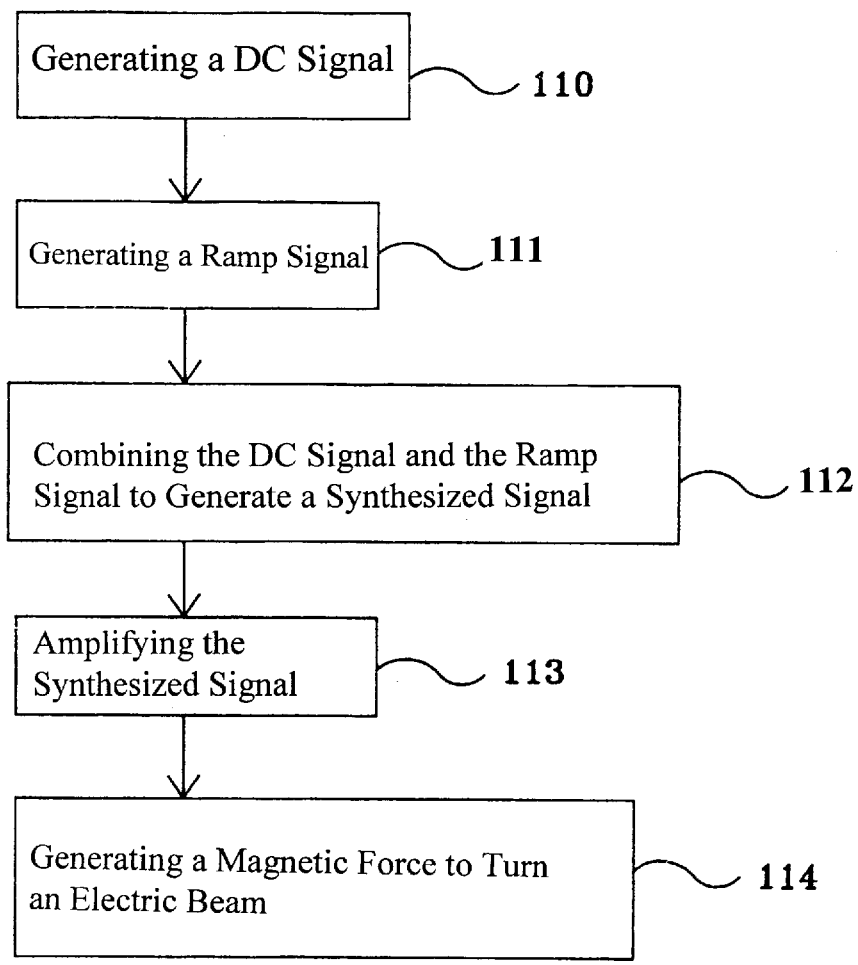
FIG. 11 shows the flow diagram of the method according to the present invention.

FIG. 10A shows a side view of the rotate coil made of copper wire, whose diameter is about 0.2 centimeter, and FIG. 10B shows the perspective view of the rotate coil. FIG. 11 shows the flow diagram of the method according to the present invention. Firstly, a DC signal is generated in step 110, where the DC signal is a DC voltage or a DC current. In step 111, a periodic ramp signal is generated, where the period of the ramp signal is the same as the vertical period of the screen display of the CRT. Afterwards, the DC signal and the ramp signal are added to generate a synthesized signal in step 112. The DC level of the synthesized signal is determined by the DC level of the DC signal. Next, the power or current of the synthesized signal is amplified (step 113), and a corresponding magnetic force is generated in step 114. The magnetic force is then used to turn the electric beam inside the CRT, therefore compensating the trapezoidal distortion on the top and the bottom edges of the screen display. This magnetic force is usually generated by a rotate coil surrounding the neck of the CRT.

Although specific embodiments have been illustrated and described, it will be obvious to those skilled in the art that various modifications may be made without departing from the spirit which is intended to be limited solely by the appended claims.

What is claimed is:

1. Apparatus for compensating trapezoidal distortion on a bottom edge and a top edge of a screen display, comprising:

DC signal generating means for generating a DC signal;

ramp signal generating means for generating a periodic ramp signal;

synthesizing means for adding said DC signal and said ramp signal to generate a synthesized signal, the DC level of said synthesized signal being determined by the DC level of said DC signal;

driving means for amplifying the power of said synthesized signal; and rotate coil means surrounding the neck of a cathode-ray tube, responsive to said amplified synthesized signal, for generating a magnetic force to turn an electron beam in the cathode-ray tube, thereby compensating the trapezoidal distortion on the bottom edge and the top edge.

2. The apparatus according to claim 1, wherein the period of said ramp signal is the same as the vertical period of the screen display.

3. The apparatus according to claim 1, wherein said synthesizing means comprises an analog adder.

4. The apparatus according to claim 1, wherein said driving means comprises a power amplifier.

5. The apparatus according to claim 1, wherein said amplified synthesized signal becomes zero when said DC signal is equal to a reference signal and said ramp signal is zero.

6. The apparatus according to claim 5, wherein one of the bottom and the top edges is turned when said synthesized signal is greater than the reference signal.

7. The apparatus according to claim 5, wherein one of the bottom and the top edges is turned when said synthesized signal is smaller than the reference signal.

8. The apparatus according to claim 5, wherein both the bottom and the top edges are turned when a portion of said synthesized signal is greater than the reference signal and the other portion of said synthesized signal is smaller than the reference signal.

9. The apparatus according to claim 8, wherein said top edge is turned opposite to the bottom edge.

10. The apparatus according to claim 1, wherein said rotate coil means comprises a rotate coil.

11. The apparatus according to claim 10, wherein said rotate coil is a copper wire.

12. Apparatus for compensating trapezoidal distortion on a bottom edge and a top edge of a screen display, comprising:

DC signal generating means for generating a DC signal;

ramp signal generating means for generating a periodic ramp signal;

an adder for adding said DC signal and said ramp signal to generate a synthesized signal, the DC level of said synthesized signal being determined by the DC level of said DC signal;

an amplifier for amplifying the power of said synthesized signal; and a rotate coil surrounding the neck of a cathode-ray tube, responsive to said amplified synthesized signal, for generating a magnetic force to turn an electron beam in the cathode-ray tube, thereby compensating the trapezoidal distortion on the bottom edge and the top edge.

13. The apparatus according to claim 12, wherein one of the bottom and the top edges is turned when said synthesized signal is greater than the reference signal.

14. The apparatus according to claim 12, wherein one of the bottom and the top edges is turned when said synthesized signal is smaller than the reference signal.

15. The apparatus according to claim 12, wherein both the bottom and the top edges are turned when a portion of said synthesized signal is greater than the reference signal and the other portion of said synthesized signal is smaller than the reference signal.

16. A method for compensating trapezoidal distortion on a bottom edge and a top edge of a screen display, comprising the steps of:

generating a DC signal;

generating a periodic ramp signal;

adding said DC signal and said ramp signal to generate a synthesized signal, the DC level of said synthesized signal being determined by the DC level of said DC signal;

amplifying the power of said synthesized signal; and generating a magnetic force to turn an electron beam in the cathode-ray tube, thereby compensating the trapezoidal distortion on the bottom edge and the top edge.

17. The method according to claim 16, wherein the period of said ramp signal is the same as the vertical period of the screen display.

18. The method according to claim 16, wherein said amplified synthesized signal becomes zero when said DC signal is equal to a reference signal and said ramp signal is zero.

19. The method according to claim 18, wherein said step of generating the synthesized signal comprises the step of:

generating said synthesized signal greater than the reference signal to turn one of the bottom and the top edges.

20. The method according to claim 18, wherein said step of generating the synthesized signal comprises the step of:

generating said synthesized signal smaller than the reference signal to turn one of the bottom and the top edges.

21. The method according to claim 18, wherein said step of generating the synthesized signal comprises the step of:

generating said synthesized signal to turn both the bottom and the top edges, wherein a portion of said synthesized signal is greater than the reference signal and the other portion of said synthesized signal is smaller than the reference signal.

22. The method according to claim 16, wherein said magnetic force is generated by a rotate coil.

* * * * *